Aug. 21, 1951  A. C. JOHNSON, JR., ET AL  2,564,695
PLASTIC CARTRIDGE CASE AND METHOD OF MAKING SAME
Filed Jan. 13, 1949  3 Sheets-Sheet 1

INVENTORS:
ARTHUR C. JOHNSON, JR.
RALPH O. PHILLIPS
BY
ATT'Y

Aug. 21, 1951   A. C. JOHNSON, JR., ET AL   2,564,695
PLASTIC CARTRIDGE CASE AND METHOD OF MAKING SAME
Filed Jan. 13, 1949   3 Sheets-Sheet 2

INVENTORS:
ARTHUR C. JOHNSON, JR.
RALPH O. PHILLIPS.
BY
ATT'Y

Aug. 21, 1951 A. C. JOHNSON, JR., ET AL 2,564,695
PLASTIC CARTRIDGE CASE AND METHOD OF MAKING SAME
Filed Jan. 13, 1949 3 Sheets-Sheet 3

INVENTORS:
ARTHUR C. JOHNSON, JR.
RALPH O. PHILLIPS
BY
ATT'Y

Patented Aug. 21, 1951

2,564,695

UNITED STATES PATENT OFFICE 2,564,695

PLASTIC CARTRIDGE CASE AND METHOD OF MAKING SAME

Arthur C. Johnson, Jr., Lynn, Mass., and Ralph O. Phillips, Londonderry, Vt.

Application January 13, 1949, Serial No. 70,782

12 Claims. (Cl. 102—43)

(Granted under the act of March 3, 1883, as amended April 30, 1928; 370 O. G. 757)

This invention relates to a cartridge case made of plastic or with a fabric reinforcement, and to the method of making it.

Some cartridge cases heretofore have been made of paper, but these have usually been in the smaller sizes and apparently do not have the necessary strength, resistance to fire, moisture and solvents which is necessary for the larger sizes of cartridges. The present invention is not limited to the particular size, but by making the entire case or the shell of plastic or of fabric treated or impregnated with plastic, a cartridge case of suitable size is formed which has the required strength and resistance. It does not reduce the interior volume while maintaining the required outside dimensions, and it may closely resemble an all metal cartridge case of the same size.

An important object of the invention is to provide a light and strong cartridge case which may be made of non-metallic materials available in large quantities.

A further object of the invention is to provide a substitute for the present brass cartridge cases, which will also withstand severe handling and would be expendable.

Still a further object of the invention is to provide a cartridge case made from a material of sufficient strength which affords a reduction in weight, particularly in the larger calibers.

Another object of the invention is to provide a cartridge case made of laminated fabric sheets impregnated or treated with a hardening or setting plastic which is reinforced by the fabric.

Other objects will appear in the specification and will be apparent from the accompanying drawings, in which, Fig. 1 is a composite pictorial representation of a progressive method of making a cartridge shell of laminated sheets treated with a plastic hardening material and attaching it to a metal base, in accordance with this invention;

In this invention a plastic material, preferably a laminated fabric treated or impregnated with a suitable hardening resin, is molded to conform to the general dimensions of a regular metallic cartridge case. A great deal of time is consumed in the manufacture of metallic cartridge cases and much equipment is necessary in the heat treatment or annealing during the various forming stages of the metal. In the molding or application of a plastic laminate, either as a complete cartridge case or as a portion thereof, this long annealing process is not encountered, and the advantages of material, weight, and rapid production are obtained.

Figure 1:
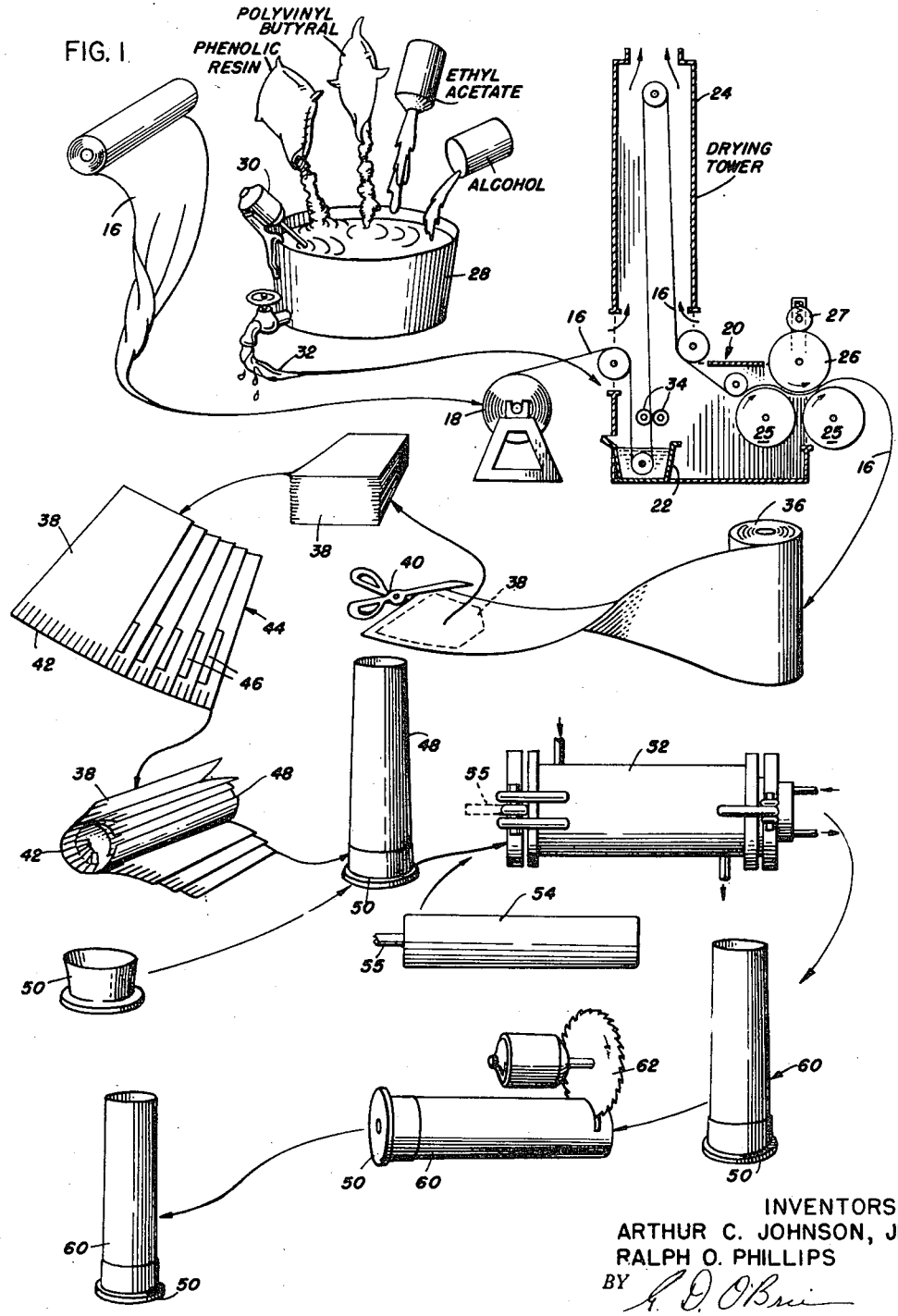
Figure 2:
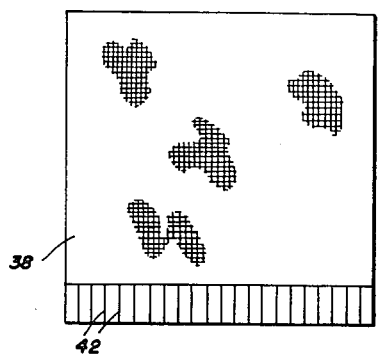
Fig. 2 is a face view of a pattern sheet of which a cartridge case shell is made.
Figure 3:
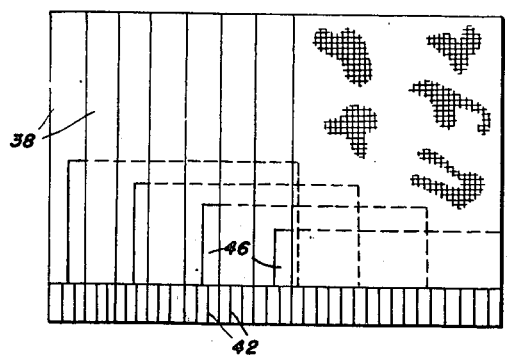
Fig. 3 is a pattern lay-up of several sheets for making a cartridge shell.

Referring more particularly to Fig. 1 of the drawings, a graphic representation of the manufacture of a cartridge case with a metal base and a plastic shell is shown in which a filler material 16 such as fiber glass, glass cloth, cotton fabric, or other woven, knitted or matted fabric or fibrous material in sheet form is discharged from a roll 18 into and through a treating machine 20 which comprises various rollers for drawing and guiding a continuous web of the material through a dip tank 22 at the bottom, upwardly and downwardly in a heater or airflow drying tower 24, to remove the volatile constituents from the resin mixture, and outwardly from driving rollers 25 and 26, the latter engaged by a pressure roller 27.

A plastic combination of various ingredients is agitated in a tank 28 by a mixer 30, which may be delivered by a hose 32, or other suitable means to the dip tank 22. Squeeze rollers 34 are located close together over the tank to receive the web of material from the tank between them and to return surplus plastic liquid to the tank.

The coated or impregnated fabric material is dried by heat or the plastic is allowed to set in the machine 20 and may be delivered therefrom into a roll 36 from which main body sheets 38 are cut to any desired shape or size by any suitable means represented by a pair of shears 40. These main body sheets 38 are provided with parallel cuts 42 extending inwardly from one edge forming bendable tongues, and are laid out in an overlapping or stepped pattern 44, corresponding opposed steps being formed along two opposite edges of the layout, with opposed steps ascending in opposite directions, and shorter reinforcing sheets 46 are interposed between the other sheets in corresponding stepped relation and further are stepped in the direction perpendicular to the above direction of stepping.

This layout is then wrapped in a cylindrical shape 48 with opposed corresponding steps overlapping as shown in Fig. 1, the slit edges are turned inwardly at one end, and this end is inserted in a metal cartridge base 50. The cartridge assembly is inserted into a jacketed metal mold 52, the interior of which conforms to the external shape of a particular cartridge case. A rubber molding bag 54, or a substitute therefor, is inserted within the wrapped cylindrical shape in the mold and pressure is applied to the bag through a stem 55 to force it outwardly and to compress the cartridge shell assembly in the mold and into the base 50.

An alternate way is to wrap the flat layout around the bag 54 as a mandrel and to bend the fabric tongues over one end of the bag. A cartridge base 50 is applied tightly over the tongues and this assembly is inserted in the mold 52 and pressure applied to the bag.

In either method of assembly and insertion in the mold, the bag is inflated or other means is employed to force the pattern assembly outwardly against the mold wall. Heat is applied to a jacket 56 (Fig. 4) around the shell and to an end jacket 58, and a definite cure cycle is followed. The mold may be cooled by the jackets, pressure is released from the molding bag, and a completed cartridge case 60 is removed from the mold.

Figure 5:
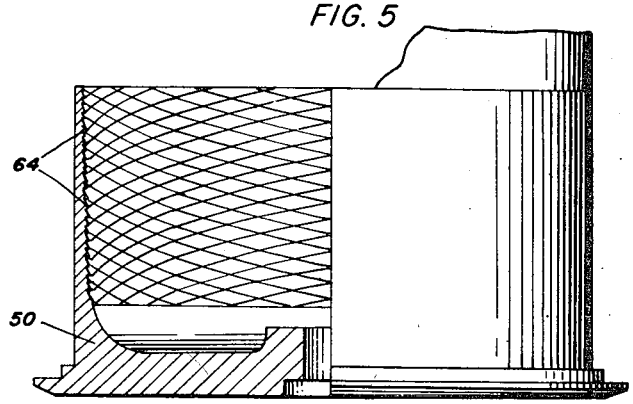
Fig. 5 is a part-sectional view of a metallic cartridge shell base with inner receiving grooves.
Figure 12:
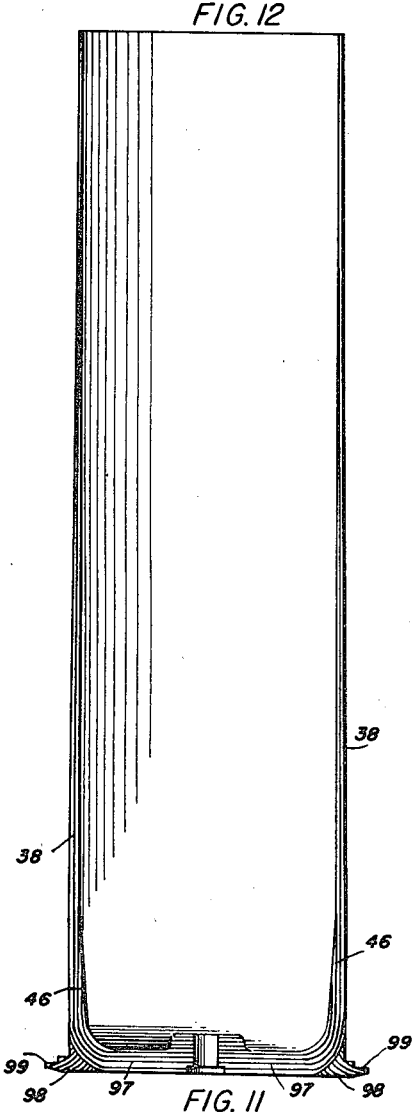
Fig. 12 is a sectional view of an entire cartridge case with the base and shell made of layers of plastic treated fabric laminations.

The molded cartridge case shell is hard and tough and is trimmed to the proper length by applying a saw 62 to the outer edge. In applying a plastic shell of this kind to a metal base it is preferable to have the inner surface of the base formed with angular grooves 64 (Fig. 5) circular or spiral in extent and the points of the grooves extending inwardly to anchor the plastic shell more firmly therein. The circumferentially stepped relationship of the body and reinforcing sheets and their overlapping arrangement thereby provides for a laminated tubular structure whose wall thickness at any cross-sectional stratum is substantially uniform, and yet provides for a large bonding surface for the seam holding the sheets in tubular contour. Also, the axial or longitudinal stepping of the reinforcing sheets provides for a tapered wall thickness along the length of the case, as shown in Fig. 12.

These cartridge cases are produced from thermosetting and thermoplastic resins including such materials as phenol, urea and melamine formaldehydes, lignin, polyvinyl formal, butyral polyvinyl chloride, and chloride acetate copolymers, polyester type resins, thermoplastic resins such as cellulose acetate, cellulose acetate butyrate, cellulose butyrate, cellulose propionate, and ethyl cellulose, any any suitable resin and modifications of the above resins. Combinations of both principal types are preferred to give the advantages thereof in accordance with the following examples:

(1) One example of a definite resin formation is prepared in the following manner: 66 pounds of alcohol is mixed with 8 pounds of ethyl acetate in a container, to which 18.75 pounds of polyvinyl butyral is added with constant mixing, taking about ten minutes to add it completely. Agitation is continued for thirty minutes, following which 14 pounds of alcohol is added, allowing ten minutes for adding it completely. This mixture is agitated for one hour after which 6.25 pounds of a 100 per cent phenolic resin is added, taking about five minutes for adding it completely. The entire mixture is then agitated for one-half hour completing the mix which should have a specific gravity between 0.860 and 0.865.

(2) Another plastic mixture using lignin has the following ingredients and proportions:

|  | Per cent |
| --- | --- |
| Lignin resin | 17.0 |
| Denatured ethyl alcohol | 33.0 |
| Phenolic resin | 18.0 |
| Water | 32.0 |

The lignin is suspended first in the alcohol. The phenolic resin should be of a water soluble type with additional water added in order to conform to the stated proportions. The phenolic resin is then mixed by vigorously stirring it into the lignin alcohol suspension.

(3) Another example of a suitable mixture is phenol-formaldehyde resin varnish diluted in alcohol to result in 40 per cent solids.

(4) Still another example is prepared as follows: dissolve polyvinyl butyral in methyl ethyl ketone and add this mixture to a polyester type (laminated contact resin) making a 20 per cent resin solids varnish with 60 per cent polyester resin and 40 per cent polyvinyl butyral.

In the coating or impregnating operation for glass fabric it is desirable that the resin content should be between about 32 and 35 per cent on a weight basis. Other materials, both resin and sheet reinforcements, are similarly coated or treated, the resin content varying depending upon the resin or fabric used. The amount of resin retained in the material may be varied by changing the pressure of the squeeze rollers 34.

Figure 4:
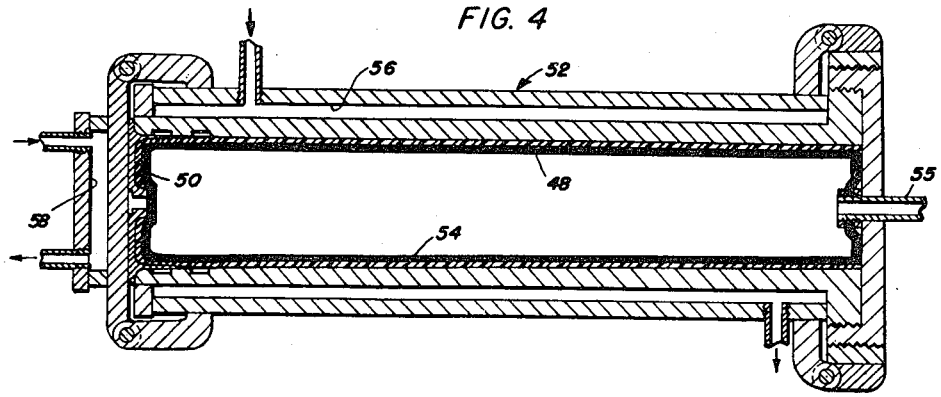
Fig. 4 is a sectional view of a cartridge case mold.

In molding the shell, both ends of the mold are closed, as in Fig. 4 and 150 pounds pressure is applied to molding bag 54. A heating medium such as steam is applied to the jackets 56 and 58 to obtain a curing temperature of 300° F. This heat is maintained for 30 minutes, after which the steam is released, and a cooling medium such as water is applied to the jackets for cooling the formed case. After the curing and cooling cycles are finished, pressure on the mold bag is relieved, the ends of the mold are opened, and the finished cartridge case is knocked out of the mold.

Instead of making the shell only of the cartridge case of plastic, the base usually made of metal, may be separately formed of plastic; or a portion of the metal base may be utilized as a frame or reinforcement for a plastic portion or portions, thus lightening the base; or the entire case including the shell and the base may be simultaneously made of plastic, plastic reinforced by a suitable fabric, or laminations of plastic treated fabric.

Figure 6:
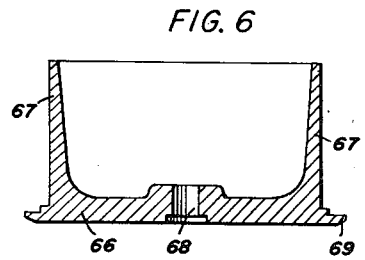
Fig. 6 is a sectional view of a standard metal cartridge base.

In Fig. 6, a standard metal base 66 is shown with an outer circular tapering side wall 67, a central firing cap opening 68, and a projecting flange 69. Heretofore this base has usually been made of brass, but may also be made of copper, aluminum, steel, or other metal.

Figure 7:
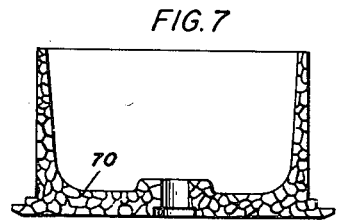
Fig. 7 is a sectional view of a shell base made of macerated plastic treated filler.
Figure 8:
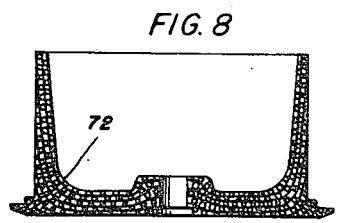
Fig. 8 is a sectional view of a shell base made of coated layers of filament in cross layers.

A base 70 of similar shape, as shown in Fig. 7 may be made of macerated resin coated or impregnated material, such as fiber glass, cotton, or other fabrics. As shown in Fig. 8, a base 72 may be made of layers of coated filaments or yarns, coated with resin and laid up in alternating directions, in mop-like fashion.

These separate bases made entirely of plastic material or plastic reinforced by fabric may be combined with laminate shells by the same method as described in connection with the all metal bases. In the larger sizes particularly, the difference in weight, compared with the all metal shells is very noticeable.

Figure 9:
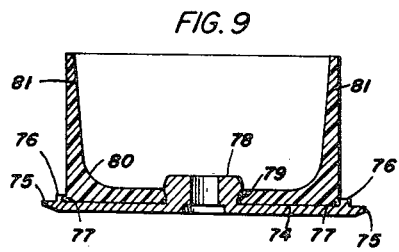
Figs. 9, 10 and 11 are sectional views of different metal bases for reinforcing plastic sections applied thereto.
Figure 10:
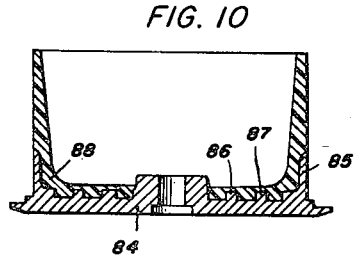
Figure 11:
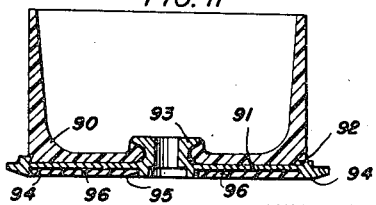

In Figs. 9, 10 and 11 the plastic treated material is applied to a metal supporting frame or reinforcement to form a base, after which the laminate shell as described is molded thereto. In Fig. 9, a flat metal base 74 has a projecting rim 75 with a reduced shoulder 76 having an inwardly cut attaching edge 77; and at the center is a circular projection 78 having an undercut outer edge 69 opposite the edge 77. Between these two opposite undercut edges 77 and 79 is molded a plastic section 80 having an outer circular tapered wall 81. In Fig. 10, a metal base 84 has a short outer side wall 85 and inner circular rib rings 86 and 87 within which a plastic section 88 is molded.

In Fig. 11 a plastic section 90 is molded on one side of a metal base 91 and adheres thereto by means of an undercut outer shoulder 92 and an undercut central projection 93 (similar to Fig. 9), and on the outside by an undercut outer rib 94 and an inner projection 95 forming a plastic disk 96.

In these metal supporting frame structures (Figs. 9, 10 and 11) any plastic material is represented as molded onto the metal frame; more particularly, either the macerated plastic material (Fig. 7), the layer plastic material (Fig. 8), or the laminate structure (Fig. 11) may be incorporated with the frame by molding it thereon. These bases are then combined with laminate shells by the same method as described for the all metal base.

In making the entire cartridge case of laminate plastic materials as represented in Fig. 12, the method of making it may be similar to the described method of making the shell only. A pattern of plastic treated sheets (38, 46) is laid up with sufficient thickness at the base end so that some tongues 97 formed by slits 62 are turned inwardly to form the inner material of the base, and some tongues 98 are turned outwardly to form the rim 99. When molded under heat and pressure the laminate sheets are disposed substantially as represented by the sectional view in Fig. 12, the completed structure has great strength due to the fabric reinforcement, and the wall sections are not substantially thicker than the all-metal shells of the same external size or caliber.

In carrying out the method of this invention a unitary all plastic cartridge case may be produced, or a plastic base may be made separately and a shell attached thereto to provide a composite all plastic case; a metal base may be supplied with a laminate plastic shell; and a metal base frame may be used to reinforce plastic material applied thereto inside of the base or both inside and outside of the base.

Many advantages are claimed in the use of a plastic cartridge case, among which may be mentioned: reduction in weight and therefore more easily transported and handled; rapid production limited only by the molding cycle; ease of manufacture, including relatively low cost equipment and facilities compared with metal case manufacture; the material will withstand more severe handling, as it will not dent easily; laminate material is a poor conductor of heat, which therefore retards the heating of a gun chamber; the cases are not hot after firing and may be handled by the operating personnel; another available material is provided which may be made in different colors for distinctive identification; empty cases may be inspected for uniformity of material by inserting a strong light inside of the case to afford a visual external inspection; filled cases may be examined in an external light source to determine the amount of powder in the cases. This is of value for mortars and other charges, where different weights of powder are used; and the cases may be produced at a lower cost and are disposable.

Although plastic cartridge cases made by this method are disclosed in some detail they should be regarded as an illustration or an example and not as a restriction or limitation, as many changes in the construction combination and arrangement of the parts and in the method of practising the invention may be made without departing from the spirit and scope of the invention.

The invention herein described may be manufactured and used by or for the Government of the United States of America for governmental purposes without the payment of any royalties thereon or therefor.

We claim:

1. A cartridge case having a base to receive a central firing cap from the outside and recessed at the inside, and a laminated fabric shell comprising a plurality of strips of different sizes placed together along one edge of each strip and overlapping successively at right angles thereto, the edges placed together having slits therein to form bendable tongues, the strips being rolled together to form a shell graduated in thickness from the slit ends and the tongues turned inwardly for seating this end of the sleeve into the recess and connecting it to the base, and thermoplastic reinforcing means for the fabric strips securing them together and sealing them in the base.

2. The method of making a cartridge case of laminated fabric strips which comprises placing a number of strips together along one edge and overlapping the edges at right angles thereto, slitting the common edges to form bendable tongues, rolling the strips together in the overlapping direction and bending the tongues inwardly to form the base of the case.

3. The method of making a cartridge case of a plastic reinforced fabric, which comprises applying thermo-plastic material to fabric from a roll, cutting strips thus treated from the roll, placing one edge of all strips together but overlapping the edges at right angles thereto, slitting the common edges to form bendable tongues, rolling the strips together in the overlapping direction, bending the tongues inwardly to form a base closed except at the center, and subjecting the strips thus formed in a roll with tongues bent to heat and pressure to provide a hollow case.

4. The method of making a cartridge case of laminated fabric strips of various sizes placed together in overlapping relation with one of the edges of each strip in common with the others, slitting the common edges to provide bendable tongues, rolling the strips together in the overlapping direction to produce a shell graduated in thickness from the slit edge oppositely therefrom, and bending the tongues inwardly together to form the end of the case.

5. The method of making a cartridge case of laminated fabric strips placed together along one edge and overlapping at the edges at right angles thereto, slitting the strips at the common edges to form bendable tongues, impregnating the strips with thermo-setting plastic, wrapping the strips around an expansible core in the overlapping direction and turning the tongues over the end of the core to form a substantially closed end, placing the wrapped strips and the core in a mold, inflating the core to compress the wrapped strips, and applying heat to set the plastic in the mold.

6. The method of making a cartridge case of plastic reinforcing fabric, which comprises treating fabric from a roll with a thermo-setting plastic, cutting fabric strips of different sizes from the treated end of the roll, placing these strips together with one edge in common and overlapping at the ends, cutting slits in the common edge to form bendable tongues, rolling the strips about a hollow expansible core in the overlapping direction of the strips, bending the tongues over one end of the core leaving a central opening at the end, inserting this end into a cartridge base, placing the wrapped core and base in a mold, inflating the core to press the wrapped fabric against the outside of the mold and the fabric end into the base, and applying heat to the mold to secure the fabric end in the base and to form a shell graduated in wall thickness from the base to the free end thereof.

7. The method of making a cartridge case of laminated strips impregnated with a setting plastic which comprises slitting one edge of each strip to form bendable tongues, wrapping the strips in overlapping relation around a hollow expansible core, bending the tongues over one end of the core, applying a cartridge base over the bent tongues to receive the adjacent end of the portion wrapped about the core into the base, inserting the core with the wrapped strips and the base in a mold for applying heat and cold thereto, inflating the core to press the wrapped strips tightly in the mold and securing the tongued end tightly in the base, applying heat thereto, reducing the core pressure, removing the formed case from the mold, and trimming the outer end of the case to the desired length.

8. A cartridge case having a substantially tubular main body portion comprising a plurality of laminated body sheets formed of a resin impregnated fabric material, a plurality of reinforcing sheets interposed between said body sheets, said body and reinforcing sheets being stepped circumferentially with respect to each other and being bonded into tubular configuration along the overlap of corresponding opposed steps, to provide an overlap bonding area and uniform wall thickness for any cross-sectional stratum of said tubular body portion, and said interposed reinforcing sheets being further stepped longitudinally along said main body portion to provide a substantially tapered wall thickness therealong.

9. A cartridge case having a substantially tubular main body portion comprising a plurality of body sheets, a plurality of reinforcing sheets interposed between said body sheets, said body sheets being stepped circumferentially with respect to each other and being bonded into tubular configuration along the overlap of corresponding opposed steps, to provide an overlap bonding area and uniform wall thickness for any cross-sectional stratum of said body portion, and said interposed reinforcing sheets being stepped axially along said main body portion to provide a substantially tapered wall thickness therealong.

10. A substantially tubular body comprising a plurality of body sheets, a plurality of reinforcing sheets interposed between said body sheets, said body sheets being stepped circumferentially with respect to each other and being bonded into tubular configuration along the overlap of corresponding opposed steps, to provide an overlap bonding area and uniform wall thickness for any cross-sectional stratum of said tubular body, and said interposed reinforcing sheets being stepped axially along said body to provide a substantially tapered wall thickness therealong.

11. A cartridge case having a substantially tubular main body portion comprising a plurality of laminated body sheets formed of a resin impregnated fabric material, and a plurality of reinforcing sheets interposed therebetween and stepped longitudinally with respect to each other along main body portion to provide for a substantially tapered wall thickness longitudinally therealong.

12. A substantially tubular body comprising a plurality of body sheets, and a plurality of reinforcing sheets interposed therebetween and stepped axially with respect to each other along said main body portion to provide for a substantially tapered wall thickness axially therealong.

ARTHUR C. JOHNSON, JR.
RALPH O. PHILLIPS.

REFERENCES CITED

The following references are of record in the file of this patent:

UNITED STATES PATENTS

| Number | Name | Date |
|---|---|---|
| 2,131,343 | Cordiano et al. | Sept. 27, 1938 |
| 2,137,350 | Roberts | Nov. 22, 1938 |
| 2,229,982 | Mansur et al. | Jan. 28, 1941 |

FOREIGN PATENTS

| Number | Country | Date |
|---|---|---|
| 2,295 | Great Britain | of 1887 |
| 306,475 | Germany | Feb. 23, 1920 |

OTHER REFERENCES

Ser. No. 315,074, Tricou (A. P. C.), published Jan. 22, 1943 (now abandoned).